Dec. 1, 1970  J. J. HAUCK  3,543,434
FISH BAIT HOLDER
Filed Nov. 21, 1968
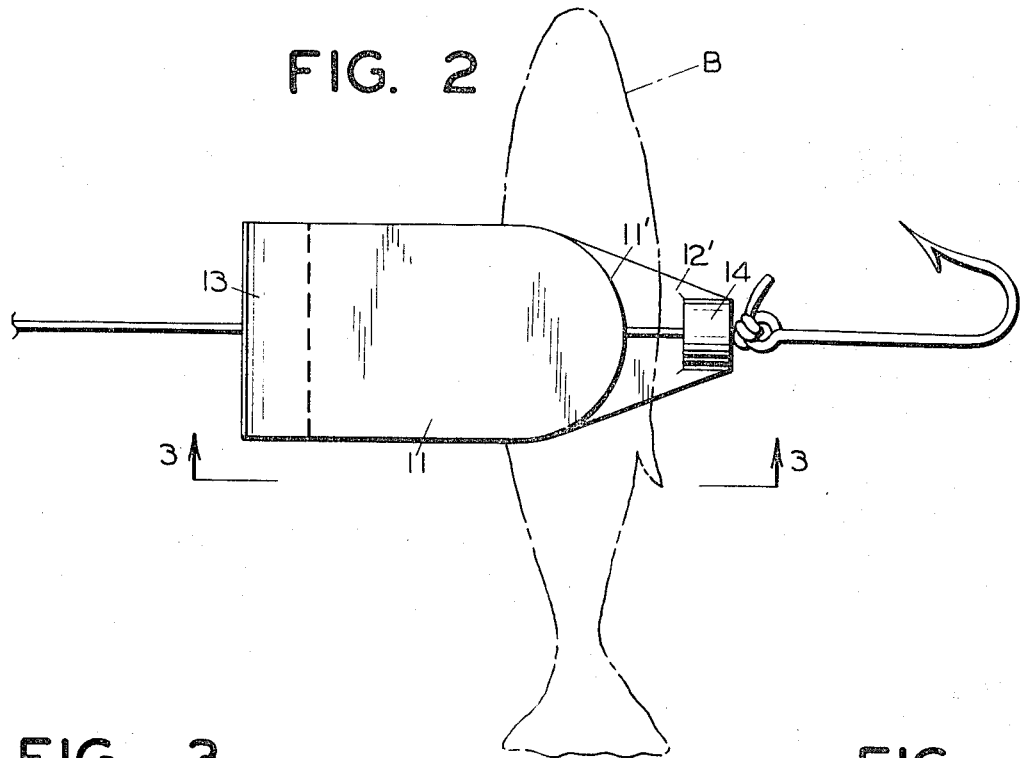
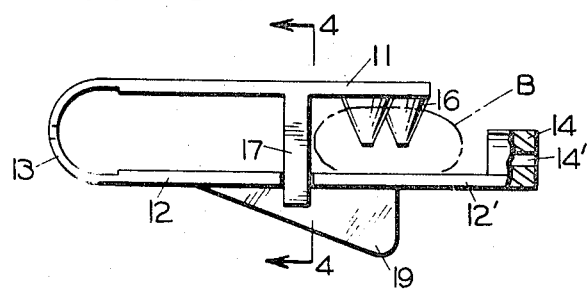
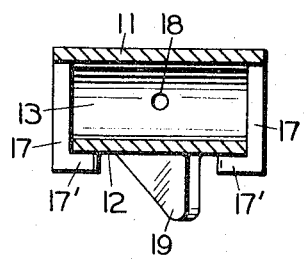
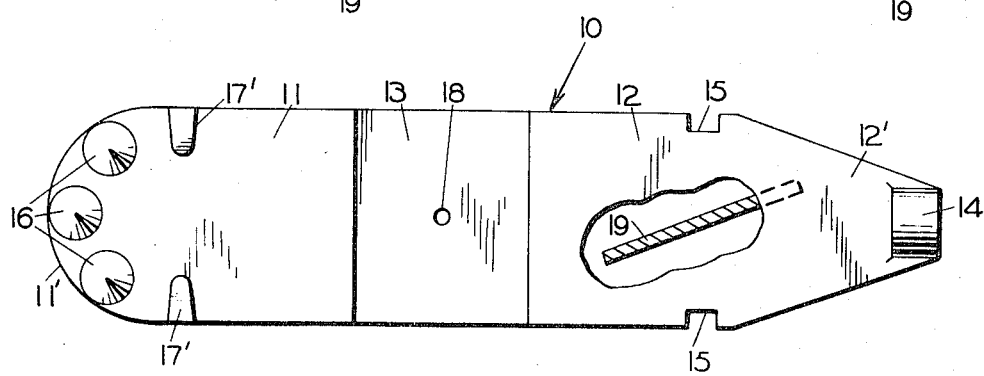
JULIUS J. HAUCK
INVENTOR.
BY *F. R. Geisler*
ATTY.

ent of the clamping brackets 17 out of the slots 15.

United States Patent Office 3,543,434
Patented Dec. 1, 1970

3,543,434
FISH BAIT HOLDER
Julius J. Hauck, 2519 Wallace Road,
Salem, Oreg. 97304
Filed Nov. 21, 1968, Ser. No. 777,733
Int. Cl. A01k 97/00
U.S. Cl. 43—44.6          1 Claim

ABSTRACT OF THE DISCLOSURE

A bait holder mountable on the fish line near the hook for holding herring and similar live bait in place transversely with respect to the fishing line, comprising an elongated resilient body with a medial flexible hinge portion enabling one portion of the body to be folded over on the other so as to secure the bait between the portions, the folded-over portion being shorter than the other portion and temporarily maintained in folded-over position by integral clips. Bait-engaging teeth are disposed on the end of the shorter portion and extend toward the other portion to hold the bait firmly in position. The holder is mounted on a fishing line which passes freely through an aperture in the hinge portion and an apertured lug on the end of the other portion.

BACKGROUND OF THE INVENTION

Various devices have previously been developed for holding a live or semi-live fish bait, such as herring, or other small fish suitable for use as bait, on the fishing line near the hook. Some devices, like the plastic bait holder and protector described in U.S. Pat. No. 2,939,241, issued June 7, 1960, to Hicks, provide a protective shield for the bait with the bait extending longitudinally along the fish line. One objection to such a holder is that the holder is limited to use with bait of a particular size. Other live bait holders, which enable bait of a larger range of sizes to be used, comprise clamping means through which the bait is held transversely. An example of such device is shown in U.S. Pat. No. 3,200,532, issued Aug. 17, 1965, to Walton. In the device of this patent the holder for the bait comprises a metal spring band which is carried on the hook itself. The fact that the holder necessarily includes a moderately strong spring and the fact that the holder is located on the hook itself combine to make the removal of the bait from the line, when the substitution of new bait is desired for any reason, somewhat troublesome.

The object of the present invention is to provide a simplified and very inexpensive holder for live or semi-live bait, which can be quickly and easily clamped around the central portion of the body of the bait so as to hold the bait transversely with respect to the fishing line as much of the bait uncovered as possible, and from which the bait can just as easily and quickly be removed when desired.

SUMMARY OF THE INVENTION

While the device of the present invention may be made from any suitable resilient, thin, lightweight material, it is preferably made of plastic, either transparent or of a color suitable to being attractive to the fish without being too startling. The holder consists of an elongated integral body having end portions of greater thickness and rigidly connected by an intermediate thinner, flexible portion which serves as a wide, resilient hinge for enabling one of the two end portions, which is preferably shorter than the other, to be folded over into parallel relationship with the other for clamping the bait between them. One of the end porions carries teeth which extend into the bait to hold the bait against slipping from the holder when the end portions of the device are brought into bait clamping position, and one of the end portions carries a pair of clamps for releasably engaging the sides of the other end portion, respectively, when the two end portions are brought into parallelism and bait-clamping position. The longer of the two end portions has a small guideway at its end through which the fish line passes and the line also passes through an aperture in the hinge portion of the holder. Thus the holder is positioned longitudinally with respect to the fish line, and when the holder is folded oven on the bait and clamped in such position, the bait extends transversely with respect to the holder and only a small part of the bait is actually covered. Preferably, although not necessarily, a fin is mounted on the outside face of one of the end portions so as to provide increased agitation of the holder and bait as the holder is moved through the water.

BRIEF DESCRIPTION OF THE DRAWINGS

In the drawings, in which the figures are drawn to a slightly enlarged scale:

FIG. 1 is a top plan view of the fish bait holder in fully open normal position prior to use, a part of one of the end portions being broken away to show the fin located on the outside face of such portion;

FIG. 2 is a top plan view showing the holder mounted on a fishing line and folded over into bait-clamping position, the bait fish being shown in broken lines;

FIG. 3 is a side elevation of the holder in operative position taken on the line indicated at 3—3 of FIG. 2; and FIG. 4 is a transverse section on line 4—4 of FIG. 3.

Referring first to FIG. 1, the holder comprises an integral body 10, preferably made of plastic, either transparent or in an appropriate color, but may also be made of any other resilient, lightweight material. The overall shape of the body 10 preferably is substantially as shown in FIG. 1, although various minor modifications in overall shape may be made without departing from the principle of the invention.

The body 10 has two end portions 11 and 12 of increased thickness to provide more rigidity to these portions, and these two end portions are joined by a thin, flexible, resilient intermediate portion 13 which provides the hinge section for the two end portions as presently apparent.

The end portion 12, which may be considered as the bottom or forward end portion, preferably has a terminal part 12' of decreasing width and carries an end lug 14 provided with a channel 14' (FIG. 3) through which the fishing line passes.

The other end portion 11, which may be considered as the upper or folded over portion, preferably is shorter than the end portion 12, for reasons indicated later, and preferably has a rounded terminal edge 11'. This portion carries teeth 16, which, when this end portion is swung over into parallelism with the other end portion 12, engage the interposed bait. This end portion 11 also carries a pair of identical, resilient, clamping brackets 17 (FIGS. 3 and 4) which are mounted perpendicular to the plane of the end portion 11 and which terminate in inwardly-extending fingers 17'. These brackets 17 are so positioned on the end portion 11 that, when this end portion is swung over into parallelism with the end portion 12, these brackets, when sprung outward slightly, will pass through the slots 15, whereupon the extending fingers 17' on the ends of these brackets will come into engagement with the opposite or outer face of the portion 12, as shown clearly in FIG. 4, thereby locking the two end portions together in this parallel relationship with the bait between them.

The separation of the portions 11 and 12 when the holder is to be reopened, is readily accomplished by springing the pair of brackets 17 outwardly sufficiently to enable the fingers 17' to become disengaged from the face of the portion 12, whereupon the portion 11 will swing back away from the portion 12 on the resilient hinge section 13.

The intermediate or hinge section 13 is provided with a central aperture 18 through which the fish line passes, and when the holder is to be mounted on the line the line is inserted through the aperture 18 and through the channel 14' of the lug 14.

FIGS. 2 and 3 show how a bait fish B (shown in broken lines) is mounted in the holder and held between the portions 11 and 12 when these are brought into parallel relationship and clamped together against the interposed bait by the brackets 17, the brackets 17 containing one side of the bait and the teeth 16 being thrust into the bait and combining to hold the bait firmly in the holder. The holder is positioned next to the hook on the end of the line as illustrated in FIG. 2.

As previously indicated, when, for any reason it is desired to remove the bait fish from the holder, this is easily accomplished by springing the brackets 17 outwardly and also, if necessary, loosening the teeth 16 from the bait fish by exerting a slight upward prying force along the edge 11' of the portion 11. The fact that the portion 11 does not extend as far as the end of the opposed portion 12 when the two portions are in bait-clamping position not only leaves more of the bait uncovered and thus causes the fish to be less apt to notice the holder, but in addition enables the finger of the fisherman to engage the edge 11' of the portion 11 more readily for the separation of these two portions.

The relative movement of the fish line and holder with respect to the water will result in a certain amount of agitation of the bait fish and holder, which, of course, will be considerably increased if the bait fish is alive and wiggling on its own account. Also preferably, but not necessarily, the agitation imparted to the holder and bait is further increased by the addition of an agitating fin on the outer face of one of the end portions. In FIGS. 1, 3 and 4 this fin 19 is shown in the preferred location, mounted on the outer or bottom face of portion 12. The fin 19 extends obliquely with respect to the longitudinal center line of the holder and with respect to the fish line, and this fin also is preferably triangularly shaped as shown with its bottom edge extending obliquely with respect to the plane of the portion 12 on which it is mounted.

The mounting of the bait in the holder and the subsequent replacement of the bait in the holder are accomplished very quickly and easily, as previously explained, and as will also be apparent, this device, particularly when made from plastic as preferred, can be produced for sale at a very nominal cost.

I claim:

1. A holder for mounting live bait in transverse position on a fishing line adjacent the fish hook, said holder comprising an elongated body of resilient material extending normally substantially in a single plane, said body having a pair of end portions of increased thickness and an intermediate or flexible portion, one of said end portions being shorter than the other, the said intermediate portion serving as a spring hinge and enabling the shorter of said end portions to be brought into parallelism with the other end portion for holding the bait between them, said intermediate portion having an aperture, an apertured lug on the end of said other end portion, the aperture in said intermediate portion and the aperture on said lug slidably receiving the fish line, a pair of resilient clamping brackets mounted on the side edges of the shorter of said end portions said brackets having elements for engaging the corresponding side edges of said other end portion for reasably holding said end portions in parallelism with each other, and bait-engaging teeth on the end of said shorter end portion beyond said clamping brackets, said teeth and said clamping brackets combining to enable the bait to be held firmly in transverse position on said holder when said shorter end portion is brought into parallelism with said other end portion of the holder.

References Cited

UNITED STATES PATENTS

| | | | |
|---|---|---|---|
| 1,673,978 | 6/1928 | Guindon | 43—41 |
| 2,780,022 | 2/1957 | Arntzen | 43—44.6 X |
| 2,939,241 | 6/1960 | Hicks | 43—41 |
| 3,040,467 | 6/1962 | Norton | 43—44.6 X |

FOREIGN PATENTS 8,409    1908    Great Britain.

SAMUEL KOREN, Primary Examiner

D. J. LEACH, Assistant Examiner